(12) United States Patent
McGuire (10) Patent No.: US 11,049,619 B1
(45) Date of Patent: Jun. 29, 2021

(54) PLASMA CREATION AND HEATING VIA MAGNETIC RECONNECTION IN AN ENCAPSULATED LINEAR RING CUSP

(71) Applicant: Lockheed Martin Corporation, Bethesda, MD (US)

(72) Inventor: Thomas John McGuire, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/725,535

(22) Filed: Dec. 23, 2019

(51) Int. Cl.
*G21B 1/05* (2006.01)
*G21B 1/11* (2006.01)
*H05H 1/04* (2006.01)

(52) U.S. Cl.
CPC .................. *G21B 1/05* (2013.01); *G21B 1/11* (2013.01); *H05H 1/04* (2013.01)

(58) Field of Classification Search
None
See application file for complete search history.

(56) References Cited

U.S. PATENT DOCUMENTS

| | | | |
|---|---|---|---|
| 4,151,498 A | 4/1979 | Katsurai | |
| 4,166,760 A | 9/1979 | Fowler et al. | |
| 4,342,720 A | 8/1982 | Wells | |
| 4,851,180 A | 7/1989 | Coppi et al. | |
| 6,495,002 B1 * | 12/2002 | Klepper | C23C 14/0635 204/192.38 |
| 6,611,106 B2 | 8/2003 | Monkhorst et al. | |

(Continued)

FOREIGN PATENT DOCUMENTS

| | | |
|---|---|---|
| FR | 1223778 | 6/1960 |
| GB | 2 164 784 A | 3/1986 |

(Continued)

OTHER PUBLICATIONS

KIPO's Notice of Last Preliminary Rejection Re KR 10-2015-7031314 (with English translation), dated Nov. 24, 2020.

(Continued)

*Primary Examiner* — Amy Cohen Johnson
*Assistant Examiner* — Srinivas Sathiraju
(74) *Attorney, Agent, or Firm* — Baker Botts L.L.P.

(57) ABSTRACT

In one embodiment, a fusion reactor includes an enclosure, one or more internal magnetic coils suspended within an interior of the enclosure and co-axial with a center axis of the enclosure, one or more encapsulating magnetic coils co-axial with the center axis of the enclosure, the encapsulating magnetic coils having a larger diameter than the internal magnetic coils, one or more mirror magnetic coils co-axial with the center axis of the enclosure, and one or more magnetic reconnection coils co-axial with the center axis of the enclosure, wherein the one or more magnetic reconnection coils, when pulsed by a power source, are disposed to reconfigure one or more magnetic fields within the enclosure. The reconfiguration, or magnetic reconnection, of the one or more magnetic fields is disposed to increase energy in the magnetic fields, thereby facilitating the conditions operable to generate plasma, and further, when the magnetic fields are collapsed, releasing the energy into the plasma.

18 Claims, 8 Drawing Sheets

(56) References Cited

U.S. PATENT DOCUMENTS

| | | | |
|---|---|---|---|
| 6,995,515 B2* | 2/2006 | Rostoker | G21B 1/05 |
| | | | 315/111.21 |
| 7,605,385 B2* | 10/2009 | Bauer | H05G 2/001 |
| | | | 250/492.2 |
| 7,719,199 B2 | 5/2010 | Monkhorst et al. | |
| 9,424,955 B2* | 8/2016 | Laberge | G21B 1/057 |
| 9,741,457 B2* | 8/2017 | Slough | G21B 1/052 |
| 9,875,816 B2* | 1/2018 | Laberge | G21B 1/057 |
| 9,997,261 B2* | 6/2018 | Tuszewski | G21B 1/052 |
| 10,217,531 B2* | 2/2019 | Rostoker | G21D 7/00 |
| 10,217,532 B2* | 2/2019 | Binderbauer | G21B 1/03 |
| 10,319,480 B2* | 6/2019 | Wong | H05H 1/10 |
| 10,418,170 B2* | 9/2019 | Rath | H05H 1/10 |
| 10,446,275 B2* | 10/2019 | Tuszewski | G21B 1/15 |
| 10,811,144 B2* | 10/2020 | Laberge | G21B 1/05 |
| 10,811,159 B2* | 10/2020 | Cohen | G21B 1/15 |
| 2001/0043661 A1* | 11/2001 | Emrich, Jr. | H05H 1/14 |
| | | | 376/140 |
| 2004/0040737 A1 | 3/2004 | Kikuchi et al. | |
| 2006/0045228 A1* | 3/2006 | Shiao | G21D 7/00 |
| | | | 376/127 |
| 2008/0069287 A1 | 3/2008 | Monkhorst | |
| 2008/0258085 A1* | 10/2008 | Bauer | H05G 2/001 |
| | | | 250/504 R |
| 2011/0142185 A1* | 6/2011 | Woodruff | G21B 1/05 |
| | | | 376/121 |
| 2011/0188272 A1* | 8/2011 | Smedley | H02M 1/4241 |
| | | | 363/37 |
| 2014/0301517 A1 | 10/2014 | McGuire | |
| 2015/0187443 A1* | 7/2015 | Tuszewski | G21B 1/052 |
| | | | 376/101 |
| 2016/0093406 A1* | 3/2016 | Rogers | G21B 1/15 |
| | | | 376/129 |
| 2017/0337991 A1* | 11/2017 | Binderbauer | G21B 1/03 |
| 2019/0318832 A1* | 10/2019 | Van Drie | H05H 1/08 |
| 2019/0318834 A1* | 10/2019 | Binderbauer | G21B 3/006 |

FOREIGN PATENT DOCUMENTS

| | | |
|---|---|---|
| JP | 01102902 | 4/1989 |
| JP | 05027061 | 2/1993 |
| JP | 07253486 | 10/1995 |
| JP | 08254584 | 10/1996 |
| JP | 59230190 | 1/2019 |

OTHER PUBLICATIONS

PCT International Search Report re PCT/US2020/062784, dated Feb. 16, 2021.

T. Yamada, et al., *Localized Electron Heating During Magnetic Reconnection in MAST*, IOP Publishing, International Atomic Energy Agency, ©2016 IAEA. Aug. 16, 2016.

\* cited by examiner

PLASMA CREATION AND HEATING VIA MAGNETIC RECONNECTION IN AN ENCAPSULATED LINEAR RING CUSP

TECHNICAL FIELD

The present disclosure generally relates to fusion reactors, and more specifically to plasma creation and heating via magnetic reconnection in an encapsulated linear ring cusp.

BACKGROUND

Fusion power is power that is generated by a nuclear fusion process in which two or more atomic nuclei collide at very high speed and join to form a new type of atomic nucleus. A fusion reactor is a device that produces fusion power by confining and controlling plasma. Typical fusion reactor designs are large, complex, and cannot be mounted on a vehicle.

SUMMARY

According to an embodiment, a fusion reactor may include an enclosure; one or more internal magnetic coils suspended within an interior of the enclosure and co-axial with a center axis of the enclosure; one or more encapsulating magnetic coils co-axial with the center axis of the enclosure, the encapsulating magnetic coils having a larger diameter than the internal magnetic coils; one or more mirror magnetic coils co-axial with the center axis of the enclosure; and one or more magnetic reconnection coils co-axial with the center axis of the enclosure, wherein the one or more magnetic reconnection coils, when pulsed by a power source, are disposed to reconfigure one or more magnetic fields within the enclosure. The reconfiguration, or magnetic reconnection, of the one or more magnetic fields may be used to create plasma and/or energize plasma to fusion conditions.

According to another embodiment, a method for generating plasma may include the steps of energizing one or more internal magnetic coils suspended within an interior of an enclosure and co-axial with a center axis of the enclosure; energizing one or more encapsulating magnetic coils co-axial with the center axis of the enclosure, the encapsulating magnetic coils having a larger diameter than the internal magnetic coils; energizing one or more mirror magnetic coils co-axial with the center axis of the enclosure; pulsing one or more magnetic reconnection coils co-axial with the center axis of the enclosure, wherein a pulse of the one or more magnetic reconnection coils is operable to reconfigure one or more magnetic fields from a baseline position within the enclosure, thereby increasing energy in the one or more magnetic fields and generating at least one magnetic null in the one or more magnetic fields; introducing fusion gas into the enclosure; and generating plasma at the at least one magnetic null.

According to yet another embodiment, a method for generating plasma fusion energy may include the steps of energizing internal magnetic coils suspended within an interior of the enclosure and co-axial with a center axis of the enclosure, the two internal magnetic coils each having a toroidal shape; energizing a plurality of encapsulating magnetic coils co-axial with the center axis of the enclosure, the encapsulating magnetic coils having a larger diameter than the internal magnetic coils; energizing two mirror magnetic coils co-axial with the center axis of the enclosure; and pulsing one or more magnetic reconnection coils co-axial with the center axis of the enclosure, wherein a pulse of the one or more magnetic reconnection coils is operable to reconfigure one or more magnetic fields from a baseline position in the enclosure, thereby increasing energy in the one or more magnetic fields and generating at least one magnetic null in the one or more magnetic fields; introducing plasma into the enclosure, the plasma disposed to gather at the at least one magnetic null; and collapsing the one or more magnetic fields to decrease the energy in the one or more magnetic fields and release the energy into the plasma.

Technical advantages of certain embodiments may include providing a compact fusion reactor that is less complex and less expensive to build than typical fusion reactor designs. Some embodiments may provide a fusion reactor that is compact enough to be mounted on or in a vehicle such as a truck, aircraft, ship, train, spacecraft, or submarine. Some embodiments may provide a fusion reactor that may be utilized in desalination plants or electrical power plants. Other technological advantages will be readily apparent to one skilled in the art from the following figures, descriptions, and claims. Moreover, while specific advantages have been enumerated above, various embodiments may include all, some, or none of the enumerated advantages.

DESCRIPTION OF EXAMPLE EMBODIMENTS

Fusion reactors generate power by confining and controlling plasma that is used in a nuclear fusion process. Typical fusion reactor designs are directed to extremely large and complex devices. Because of their prohibitively large sizes, it would not be feasible to mount them on vehicles. As a result, the usefulness of typical fusion reactors is limited.

The teachings of the disclosure recognize that it is desirable to provide a compact fusion reactor that is small enough to mount on or in vehicles such as trucks, trains, aircraft, ships, submarines, spacecraft, and the like. For example, it may be desirable to provide truck-mounted compact fusion reactors that may provide a decentralized power system. As another example, it may be desirable to provide a compact fusion reactor for an aircraft that greatly expands the range and operating time of the aircraft. In addition, it may desirable to provide a fusion reactor that may be utilized in power plants and desalination plants. The following describes an encapsulated linear ring cusp fusion reactor for providing these and other desired benefits associated with compact fusion reactors.

FIGS. 1A-1D illustrate applications of a fusion reactor 110, according to certain embodiments. As one example, in FIG. 1A, one or more embodiments of fusion reactor 110 may be utilized by aircraft 101 to supply heat to one or more engines (e.g., turbines) of aircraft 101. A specific example of utilizing one or more fusion reactors 110 in an aircraft is discussed in more detail below in reference to FIG. 2. In another example, in FIG. 1C, one or more embodiments of fusion reactor 110 may be utilized by a ship 102 to supply electricity and propulsion power. While an aircraft carrier is illustrated for the ship 102 in FIG. 1C, any type of ship (e.g., a cargo ship, a cruise ship, etc.) may utilize one or more embodiments of fusion reactor 110. As another example, in FIG. 1B, one or more embodiments of fusion reactor 110 may be mounted to a flat-bed truck 103 in order to provide decentralized power or for supplying power to remote areas in need of electricity. As another example, in FIG. 1D, one or more embodiments of fusion reactor 110 may be utilized by an electrical power plant 104 in order to provide electricity to a power grid. While specific applications for fusion reactor 110 are illustrated in FIGS. 1A-1D, the disclosure is not limited to the illustrated applications. For example, fusion reactor 110 may be utilized in other applications such as trains, desalination plants, spacecraft, submarines, and the like.

In general, fusion reactor 110 is a device that generates power by confining and controlling plasma that is used in a nuclear fusion process. Fusion reactor 110 generates a large amount of heat from the nuclear fusion process that may be converted into various forms of power. For example, the heat generated by fusion reactor 110 may be utilized to produce steam for driving a turbine and an electrical generator, thereby producing electricity. As another example, as discussed further below in reference to FIG. 2, the heat generated by fusion reactor 110 may be utilized directly by a turbine of a turbofan or fanjet engine of an aircraft instead of a combustor.

Fusion reactor 110 may be scaled to have any desired output for any desired application. For example, one embodiment of fusion reactor 110 may be approximately 10 m×7 m and may have a gross heat output of approximately 100 MW. In other embodiments, fusion reactor 110 may be larger or smaller depending on the application and may have a greater or smaller heat output. For example, fusion reactor 110 may be scaled in size in order to have a gross heat output of over 200 MW.

Figure 1A:
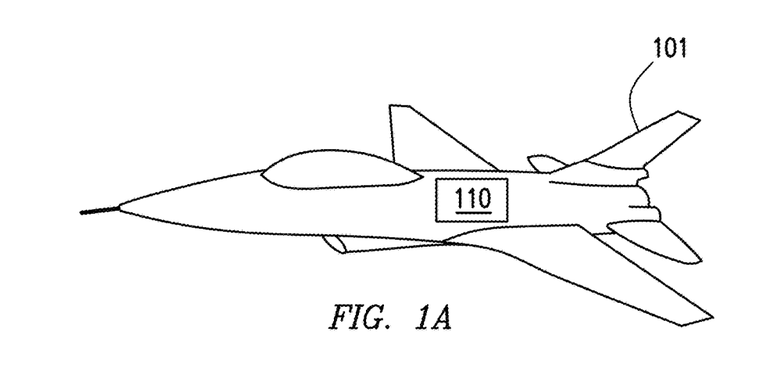
FIG. 1A illustrates an example application for fusion reactors, in accordance with certain embodiments.
Figure 1B:
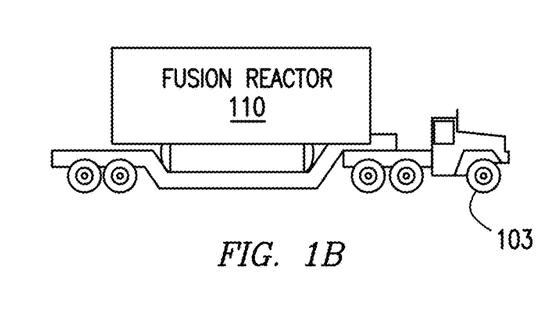
FIG. 1B illustrates another example application for fusion reactors, in accordance with certain embodiments.
Figure 1C:
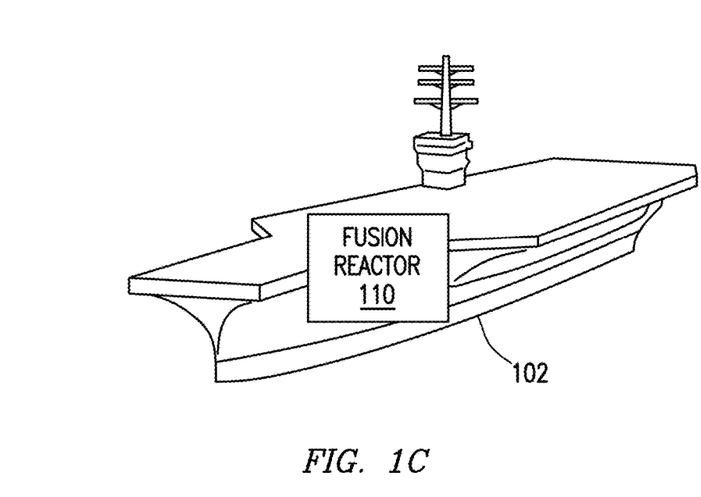
FIG. 1C illustrates another example application for fusion reactors, in accordance with certain embodiments.
Figure 1D:
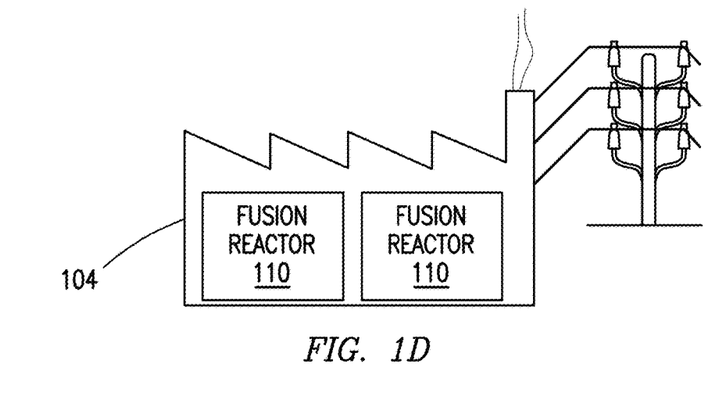
FIG. 1D illustrates another example application for fusion reactors, in accordance with certain embodiments.
Figure 2:
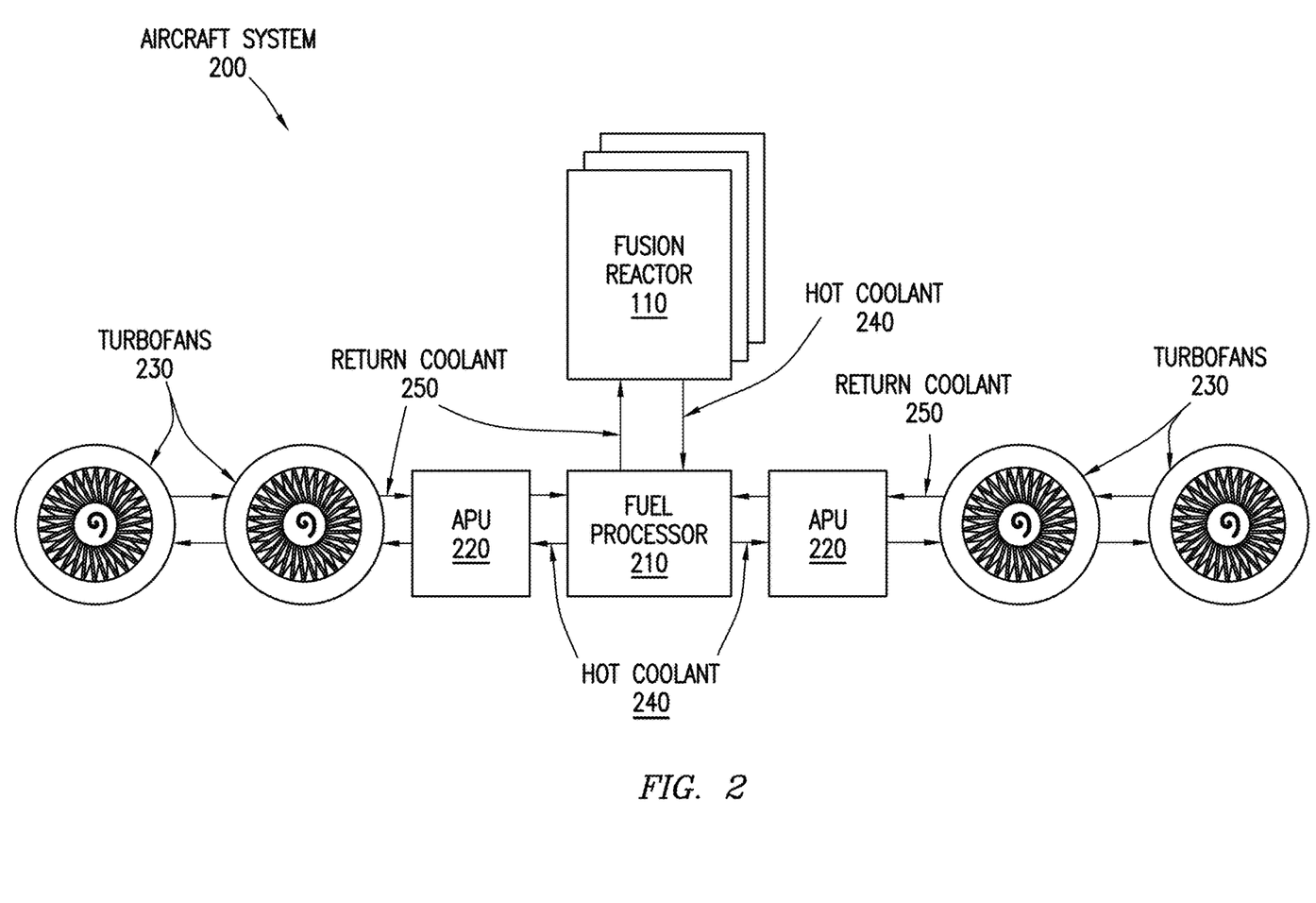
FIG. 2 illustrates an example aircraft system utilizing fusion reactors, in accordance with certain embodiments.

FIG. 2 illustrates an example aircraft system 200 that utilizes one or more fusion reactors 110, according to certain embodiments. Aircraft system 200 includes one or more fusion reactors 110, a fuel processor 210, one or more auxiliary power units (APUs) 220, and one or more turbofans 230. Fusion reactors 110 supply hot coolant 240 to turbofans 230 (e.g., either directly or via fuel processor 210) using one or more heat transfer lines. In some embodiments, hot coolant 240 is FLiBe (i.e., a mixture of lithium fluoride (LiF) and beryllium fluoride ($BeF_2$)) or LiPb. In some embodiments, hot coolant 240 is additionally supplied to APUs 220. Once used by turbofans 240, return coolant 250 is fed back to fusion reactors 110 to be heated and used again. In some embodiments, return coolant 250 is fed directly to fusion reactors 110. In some embodiments, return coolant 250 may additionally be supplied to fusion reactors 110 from APUs 220.

In general, aircraft system 200 utilizes one or more fusion reactors 110 in order to provide heat via hot coolant 240 to turbofans 230. Typically, a turbofan utilizes a combustor that burns jet fuel in order to heat intake air, thereby producing thrust. In aircraft system 200, however, the combustors of turbofans 230 have been replaced by heat exchangers that utilize hot coolant 240 provided by one or more fusion reactors 110 in order to heat the intake air. This may provide numerous advantages over typical turbofans. For example, by allowing turbofans 230 to operate without combustors that burn jet fuel, the range of aircraft 101 may be greatly extended. In addition, by greatly reducing or eliminating the need for jet fuel, the operating cost of aircraft 101 may be significantly reduced.

Figure 3A:
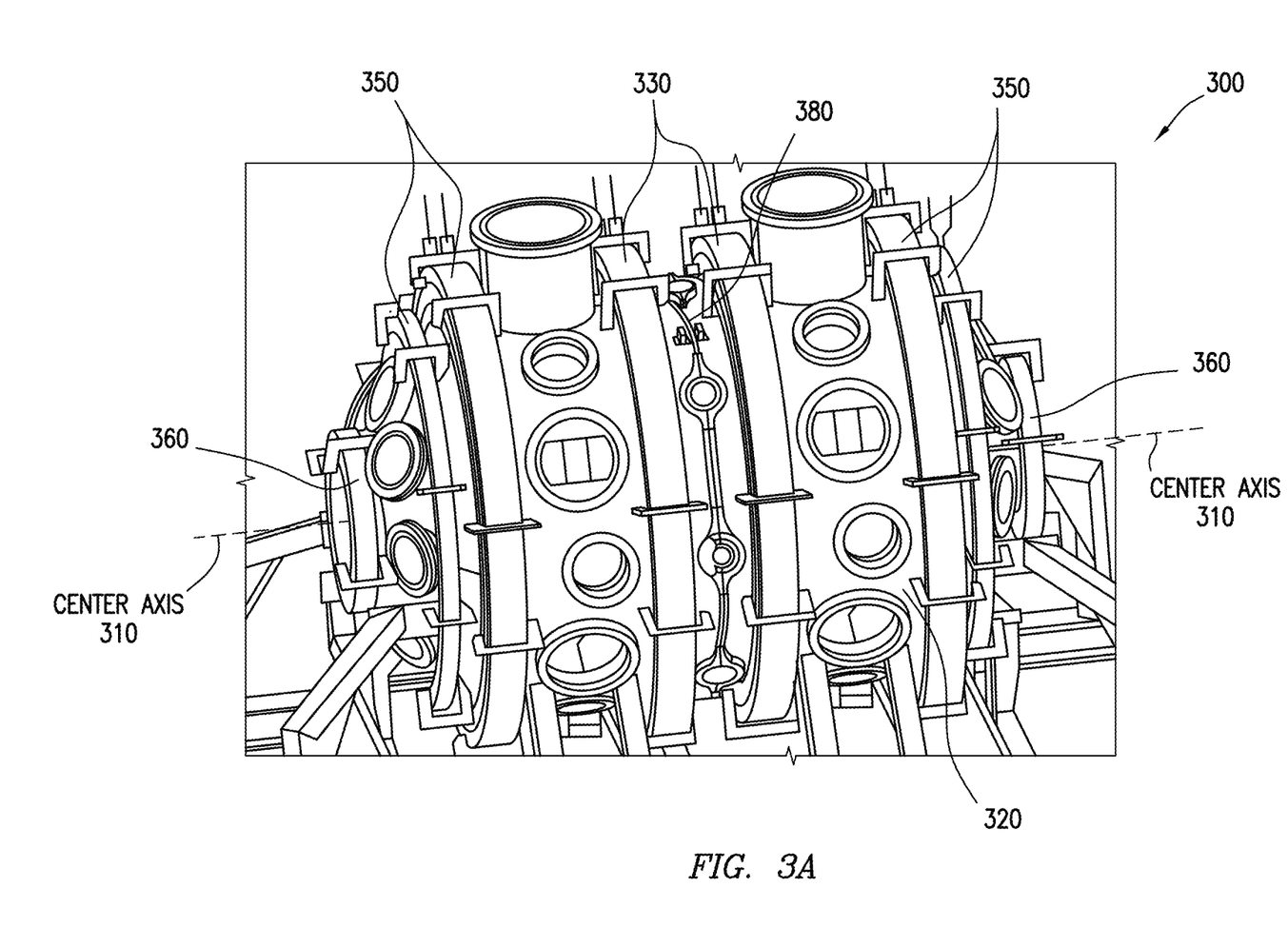
FIG. 3A illustrates an external view of an example fusion reactor utilizing a magnetic reconnection coil, in accordance with certain embodiments.
Figure 3B:
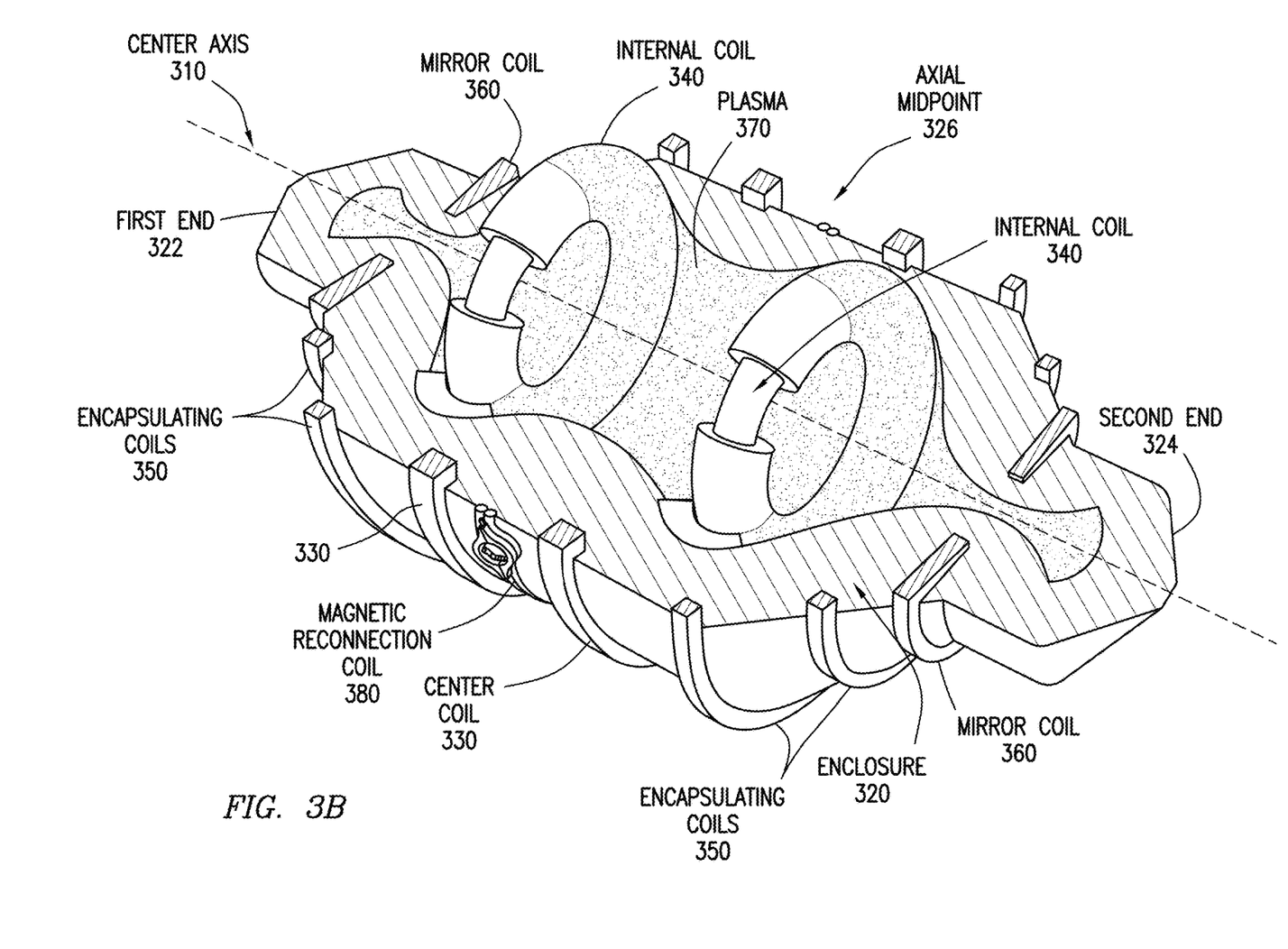
FIG. 3B illustrates an internal view of an example fusion reactor utilizing a magnetic reconnection coil, in accordance with certain embodiments.

FIGS. 3A and 3B illustrate a fusion reactor 300 that may be utilized in the example applications of FIGS. 1 and 2, according to certain embodiments. In general, fusion reactor 300 may comprise an encapsulated linear ring cusp fusion reactor in which encapsulating magnetic coils are used to prevent plasma that is generated using internal cusp magnetic coils from expanding. In some embodiments, fusion reactor 300 may include an enclosure 320 with a center axis 310 running down the length of the center of enclosure 320 as shown. In some embodiments, enclosure 320 may include a vacuum chamber. Fusion reactor 300 may further include internal coils 340 (e.g., internal coils 340, shown in FIG. 3B, are also known as "cusp" coils), encapsulating coils 350, and mirror coils 360. Internal coils 340 may be suspended within enclosure 320 by any appropriate means and may be centered on center axis 310. Encapsulating coils 350 may also be centered on center axis 310 and may be either internal or external to enclosure 320. For example, encapsulating coils 350 may be suspended within enclosure 320 in some embodiments. In other embodiments, encapsulating coils 350 may be external to enclosure 320 as illustrated in FIGS. 3A and 3B.

In general, fusion reactor 300 may provide power by controlling and confining plasma 310 within enclosure 320 for a nuclear fusion process. Internal coils 340, encapsulating coils 350, and mirror coils 360 are energized to form magnetic fields which confine plasma 370 into a shape such as the shape shown in FIG. 3B. Certain gases, such as deuterium and tritium gases, may then be reacted to make energetic particles which heat plasma 370 and the walls of enclosure 320. The generated heat may then be used, for example, to power vehicles. For example, a liquid metal coolant such as FLiBe or LiPb may carry heat from the walls of fusion reactor 300 out to engines of an aircraft. In some embodiments, combustors in gas turbine engines may be replaced with heat exchangers that utilize the generated heat from fusion reactor 300. In some embodiments, electrical power may also be extracted from fusion reactor 300 via magnetohydrodynamic (MHD) processes.

Fusion reactor 300 may comprise an encapsulated linear ring cusp fusion device. The main plasma confinement may be accomplished in some embodiments by two central linear ring cusps (e.g., center coils 330) with two spindle cusps located axially on either side (e.g., internal coils 340). These confinement regions may then be encapsulated (e.g., with encapsulating coils 350) within a coaxial mirror field provided by mirror coils 360.

The magnetic fields of fusion reactor 300 are provided by coaxially located magnetic field coils of varying sizes and currents. The ring cusp losses of the central region are mitigated by recirculation into the spindle cusps. This recirculating flow may be made stable and compact by the encapsulating fields provided by encapsulating coils 350. The outward diffusion losses and axial losses from the main confinement zones are mitigated by the strong mirror fields of the encapsulating field provided by encapsulating coils 350. To function as a fusion energy producing device, the confined plasma 370 may undergo fusion reactions and produce heat. This heat can then be harvested to produce useful heat, work, and/or electrical power.

Fusion reactor 300 is an improvement over existing systems in part because global MHD stability can be preserved and the losses through successive confinement zones are more isolated due to the scattering of particles moving along the null lines. This feature means that particles moving along the center axis are not likely to pass immediately out of the system, but will take many scattering events to leave the system. This increases their lifetime in the device, increasing the ability of the reactor to produce useful fusion power.

Fusion reactor 300 has novel magnetic field configurations that exhibit global MHD stability, has a minimum of particle losses via open field lines, uses all of the available magnetic field energy, and has a greatly simplified engineering design. The efficient use of magnetic fields means the disclosed embodiments may be an order of magnitude smaller than typical systems, which greatly reduces capital costs for power plants. In addition, the reduced costs allow the concept to be developed faster as each design cycle may be completed much quicker than typical system. In general, the disclosed embodiments have a simpler, more stable design with far less physics risk than existing systems.

Enclosure 320 may comprise any appropriate chamber or device for containing a fusion reaction. In some embodiments, enclosure 320 may be a vacuum chamber that is generally cylindrical in shape. In other embodiments, enclosure 320 may be a shape other than cylindrical. In some embodiments, enclosure 320 may have a center axis 310 running down the length of the center of enclosure 320 as illustrated. In some embodiments, enclosure 320 may include a first end 322 and a second end 324 that is opposite from first end 322. In some embodiments, enclosure 320 may include an axial midpoint 326 that is substantially equidistant between first end 322 and second end 324. The term axial midpoint 326 need not be limited to a single point on the enclosure, but may refer to any point on the external surface, internal surface, or inside the enclosure 320 that is substantially equidistant between first end 322 and second end 324 of the enclosure 320.

Some embodiments of fusion reactor 300 may include two center coils 330. Center coils 330 may generally be equidistantly located on either side of the midpoint 326 of enclosure 320. In some embodiments, center coils 330 may be collectively centered on center axis 310 and may be coaxial with internal coils 340. Center coils 330 may be either internal or external to enclosure 320, may be located at any appropriate axial position with respect to midpoint 326, may have any appropriate radius, may carry any appropriate current, and may have any appropriate ampturns.

Internal coils 340 may be any appropriate magnetic coils that are suspended or otherwise positioned within enclosure 320. In some embodiments, internal coils 340 are superconducting magnetic coils. In some embodiments, internal coils 340 are toroidal in shape as shown in FIG. 3B. In some embodiments, internal coils 340 are centered on center axis 310. In some embodiments, internal coils 340 may include two coils: a first internal coil that is located between midpoint 326 and first end 322 of enclosure 320, and a second internal coil that is located between midpoint 326 and second end 324 of enclosure 320. Internal coils 340 may be located at any appropriate axial position with respect to midpoint 326, may have any appropriate radius, may carry any appropriate current, and may have any appropriate ampturns.

Encapsulating coils 350 are any appropriate magnetic coils and generally have larger diameters than internal coils 340. In some embodiments, encapsulating coils 350 are centered on center axis 310 and are coaxial with internal coils 340. In general, encapsulating coils 350 may encapsulate internal coils 340 and may operate to close the original magnetic lines of internal coils 340 inside a magnetosphere. Closing these lines may reduce the extent of open field lines and reduce losses via recirculation. Encapsulating coils 350 may also preserve the MHD stability of fusion reactor 300 by maintaining a magnetic wall that prevents plasma 370 from expanding. Encapsulating coils 350 have any appropriate cross-section, such as square or round. In some embodiments, encapsulating coils 350 are suspended within enclosure 320. In other embodiments, encapsulating coils 350 may be external to enclosure 320 as illustrated in FIGS. 3A and 3B. Encapsulating coils 350 may be located at any appropriate axial position with respect to midpoint 326, may have any appropriate radius, may carry any appropriate current, and may have any appropriate ampturns.

Fusion reactor 300 may include any number and arrangement of encapsulating coils 350. In some embodiments, encapsulating coils 350 may include at least one encapsulating coil 350 positioned on each side of midpoint 326 of enclosure 320. For example, fusion reactor 300 may include two encapsulating coils 350: a first encapsulating coil located between midpoint 326 and first end 322 of enclosure 320, and a second encapsulating coil located between midpoint 326 and second end 324 of enclosure 320. In some embodiments, fusion reactor 300 may include two, four, six, eight, or any other even number of encapsulating coils 350. In certain embodiments, fusion reactor 300 may include a first set of two encapsulating coils 350 located between an internal coil 340 and first end 322 of enclosure 320, and a second set of two encapsulating coils 350 located between internal coil 340 and second end 324 of enclosure 320. While particular numbers and arrangements of encapsulating coils 350 have been disclosed, any appropriate number and arrangement of encapsulating coils 350 may be utilized by fusion reactor 300.

Mirror coils 360 are magnetic coils that are generally located close to the ends of enclosure 320 (i.e., first end 322 and second end 324). In some embodiments, mirror coils 360 may be centered on center axis 310 and are coaxial with internal coils 340. In general, mirror coils 360 may serve to decrease the axial cusp losses and make all the recirculating field lines satisfy an average minimum-$\beta$, a condition that is not satisfied by other existing recirculating schemes. In some embodiments, mirror coils 360 may include a first mirror coil located proximate to the first end 322 of enclosure 220, and a second mirror coil located proximate to the second end 324 of enclosure 220. Mirror coils 360 may be either internal or external to enclosure 320, may be located at any appropriate axial position with respect to midpoint 326, may have any appropriate radius, may carry any appropriate current, and may have any appropriate amp-turns.

In some embodiments, coils 330, 340, 350, and 360 are designed or chosen according to certain constraints. For example, coils 330, 340, 350, and 360 may be designed according to constraints including: high required currents (maximum in some embodiments of approx. 10 MegaAmp-turns); steady-state continuous operation; vacuum design (protected from plasma impingement); toroidal shape; limit outgassing; materials compatible with 150C bakeout; thermal build-up; and cooling between shots.

With continued reference to FIG. 3A in conjunction with FIG. 3B, fusion reactor 300 may further include one or more magnetic reconnection coils 380. The magnetic reconnection coil 380 of FIGS. 3A and 3B may comprise one or more low-inductance magnetic coils of high-voltage (HV) insulated wire. The magnetic reconnection coil 380 may be wrapped around the external circumference of the enclosure 320 substantially at or proximate to the axial midpoint 326 of the enclosure 320, and may be co-axial with the center axis of the enclosure. Although the magnetic reconnection coil 380 is described and depicted as proximate to the axial midpoint 326 of the external surface of the enclosure 320 and co-axial with the center axis of the enclosure, it is to be understood that the present disclosure is not to be so limited. For example, in an embodiment (not shown), the magnetic reconnection coil 380 may be positioned inside the enclosure 320 proximate to the axial midpoint 326 of the enclosure at a radial distance greater than that of the internal coils 340. Likewise, magnetic reconnection coil 380 may be positioned at one or more other locations on the external surface of the enclosure or at one or more other locations within the enclosure. In yet other embodiments, magnetic reconnection coil 380 may be integrated with one or more other magnetic coils 330, 340, 350, 360 of the fusion reactor 300. Alternatively, magnetic reconnection coil 380 may be separate from one or more other magnetic coils 330, 340, 350, 360 of the fusion reactor 300. In some embodiments, the positioning of the magnetic reconnection coil 380 may be based on the effect of mutual inductance caused by other coils in the fusion reactor 300, i.e., positioned such as to minimize the effect of mutual inductance and to promote the process of magnetic reconnection. In that regard, the distance between the magnetic reconnection coil 380 and the other magnetic coils 330, 340, 350, 360 may be adjusted to reduce the effect of mutual inductance. In other embodiments, magnetic shielding may be positioned around the magnetic reconnection coil 380 to reduce the effect of mutual inductance.

Figure 3C:
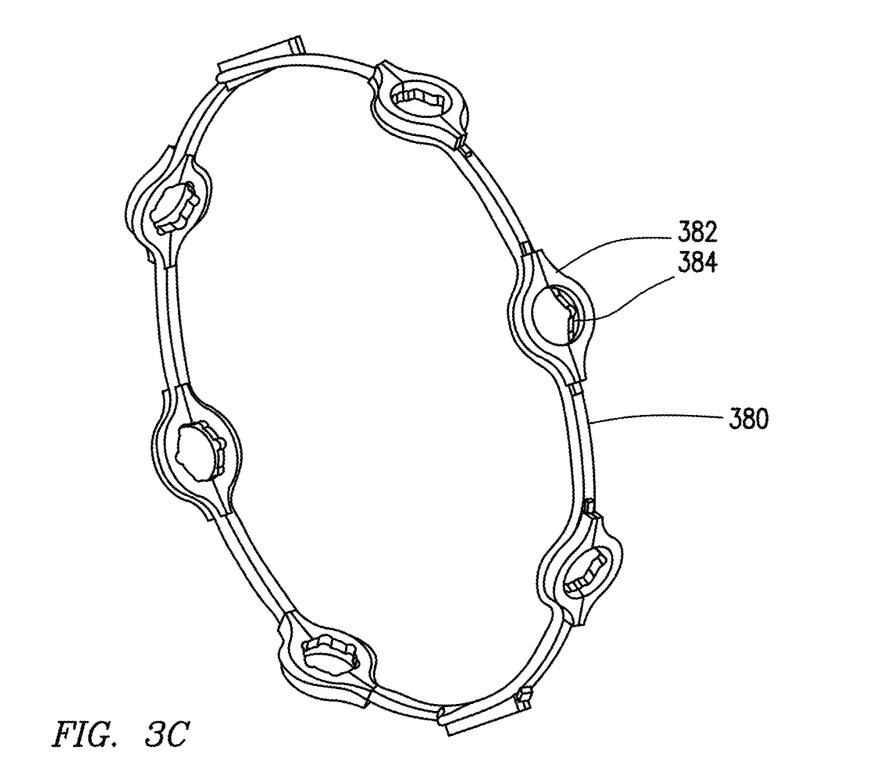
FIG. 3C illustrates a magnetic reconnection coil for use with a fusion reactor, in accordance with certain embodiments.
Figure 3D:
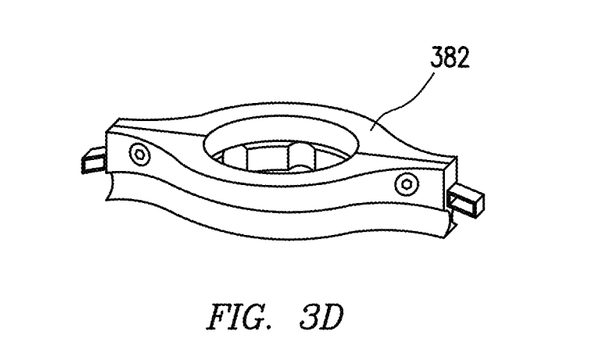
FIG. 3D illustrates an access port for use with a magnetic reconnection coil, in accordance with certain embodiments.
Figure 3E:
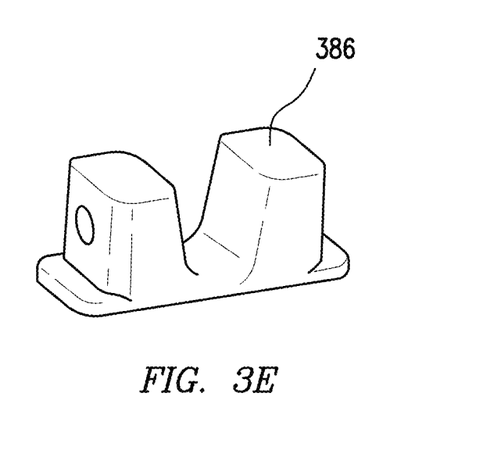
FIG. 3E illustrates a connection block for use with a magnetic reconnection coil, in accordance with certain embodiments.

Reference is now made to FIGS. 3C, 3D and 3E, wherein are shown an embodiment of a magnetic reconnection coil 380 in accordance with the present disclosure. As shown in FIGS. 3C and 3D, magnetic reconnection coil 380 may comprise two magnetic coils of HV-insulated wire routed around one or more access ports 382. FIG. 3D depicts an embodiment of an access port 382 for use in connection with magnetic reconnection coil 380. Access ports 382 may serve as adaptors to protect the magnetic reconnection coil 380 from sharp or abrasive surfaces, as well as to maintain the magnetic reconnection coil 380 at the axial midpoint 326 of the surface of the enclosure 320. Each access port 382 may include a central opening 384 so that, when the magnetic reconnection coil 380 is wrapped around enclosure 320, the central opening 384 may correspond to a circular window in the enclosure 320, thereby enabling one to view the plasma inside the enclosure 320. While FIG. 3C depicts the magnetic reconnection coil 380 as comprising two magnetic coils, it is to be understood that the configuration may include any number of coils that allow for low inductance and enable the magnetic reconnection coil 380 to pulse quickly, to thereby achieve the results described in the present disclosure. Further, in some embodiments, the configuration may include any number of access ports 382 or may include zero access ports 382 and may be attached by other means to or within the enclosure 320.

With continued reference to FIG. 3C in conjunction with FIG. 3E, magnetic reconnection coil 380 may further connect to a connection block 386, which may maintain the coils of the magnetic reconnection coil 380 at two turns without significant overlap or underlap. Magnetic reconnection coil 380 may further be connected to a capacitor-based power supply such as a solenoid magnet pulser (not shown), which may supply the power to pulse the magnetic reconnection coil 380. In an embodiment, the solenoid magnet pulser may pulse at 1 kV, 35 kA. These values may be scaled based on the reactor, and may accordingly be of higher or lower order, as understood by one of skill in the art. Each pulse of the magnetic reconnection coil 380 may include a risetime (the time it takes for the leading edge of the pulse (voltage or current), to rise from its minimum to its maximum value) and a fall time (the time it takes for the pulse to move from its maximum value back to its minimum value). In an embodiment, the risetime of pulse of the magnetic reconnection coil 380 may be approximately 0.5 ms. The risetime of the pulse may be modified and/or optimized to improve the plasma response and increase the energy transferred to the plasma. When pulsed, the direction of the current of the magnetic reconnection coil 380 may be the same as the direction of the magnetic field of the internal coils 340.

The magnetic reconnection coil 380 may utilize the principles of magnetic reconnection to convert magnetic energy into fusion energy of the plasma in the fusion reactor 300. In other words, the magnetic reconnection coil 380, applying the process of magnetic reconnection, may itself provide the energy and heat to drive the fusion reactor 300 to fusion conditions without the addition of external sources of energy and heat.

Magnetic reconnection generally refers to the breaking and reconnecting of oppositely directed magnetic field lines in plasma, whereby magnetic field energy is converted to kinetic and thermal energy. Specifically, magnetic fields in plasma are made up of field lines. Electrons and ions are confined to circular orbits around these invisible magnetic field lines. When two sets of field lines having magnetic fields which point in opposite directions get too close, they collide. As the opposing field lines cross and form an "X", they break and then reconnect to the other set of lines coming from the opposite direction, forming U-shapes that push away from each other. This process, called magnetic reconnection, results in the rearrangement of the magnetic field and transforms magnetic energy into particle energy.

In accordance with the present disclosure and as described below in connection with FIG. 4, the magnetic reconnection coil 380 may serve at least two functions in the fusion reactor 300: 1) energizing magnetic fields to create plasma; and 2) collapsing the magnetic fields of the plasma to derive fusion energy.

Figure 4:
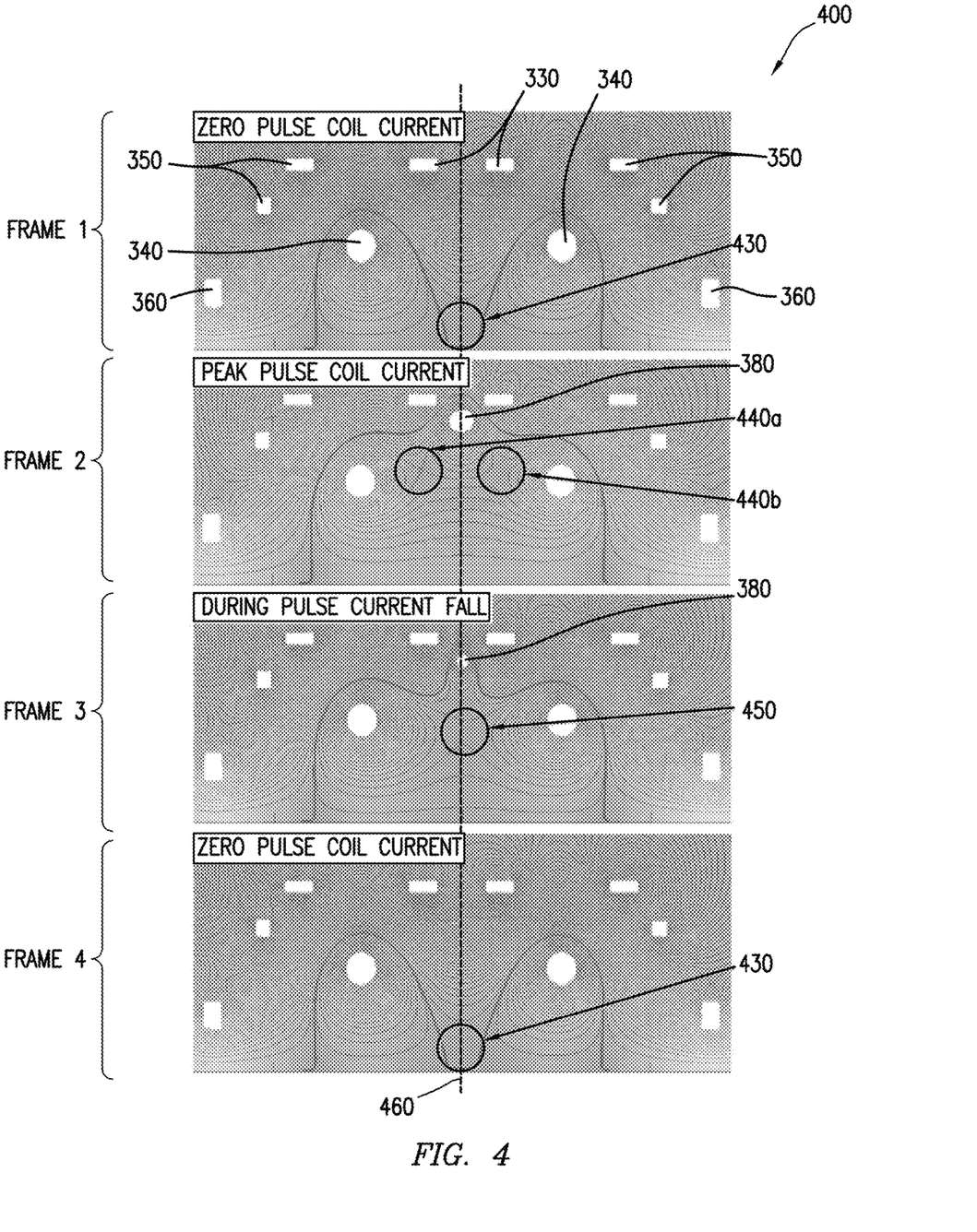
FIG. 4 illustrates field line images of a fusion reactor utilizing a magnetic reconnection coil, in accordance with certain embodiments.

Reference is now made to FIG. 4, wherein are shown Frames 1-4 of field line images depicting the chronological movement of magnetic field lines in the fusion reactor 300 utilizing the magnetic reconnection coil 380 in accordance with the present disclosure. In FIG. 4, the white rectangular blocks in the frames correspond to energized external magnetic coils (center coils 330, outer coils 350, and mirror coils 360), and the white circles correspond to energized internal magnetic coils 340. Magnetic field lines surround each of these energized coils. Additionally, it is to be noted that Frames 1-4 depict cross-sectional views of the field lines. In other words, the actual field lines are rotationally symmetric about the lower edge of each frame. Additionally, while FIG. 4 depicts that the center coils 330, the internal coils 340, the encapsulating coils 350, and the mirror coils 360 are all energized prior to the pulsing of the magnetic reconnection coil 380, it is to be understood that one or more of these coils 330, 340, 350, 360 may not need to be energized in order to carry out the functions described herein with respect to the magnetic reconnection coil 380.

The first function of the magnetic reconnection coil is to energize magnetic fields to create plasma. Generally, plasma is created when neutral gas is heated or subjected to strong electromagnetic fields such that the gas becomes increasingly electrically conductive, breaking down into ions and free electrons. The resulting matter is plasma, an ionized gas having sufficient energy to allow both the ions and the electrons to coexist. The magnetic reconnection coil 380 may produce these conditions to generate plasma. Frame 1 of FIG. 4 shows the baseline of the magnetic field prior to pulsing the magnetic reconnection coil 380, i.e., at zero pulse coil current. As shown, at the baseline, two adjacent magnetic fields 410 and 420 may be generated by internal magnetic coils 340, having a single magnetic null 430 therebetween. Magnetic null points are locations where the magnetic field strength equals zero.

With reference to Frame 2 of FIG. 4, the magnetic reconnection coil 380 may be rapidly energized (or pulsed) a single time at a speed of less than 1 ms. In an embodiment, the risetime of the pulse of the magnetic reconnection coil 380 may be approximately 0.5 ms. The risetime may be adjusted based on the specifications and/or parameters of the fusion reactor 300. The power (voltage or current) supplied by the pulse of the magnetic reconnection coil 380 may rapidly change and reconfigure the magnetic fields 410 and 420 during the risetime of the pulse. The magnetic fields 410, 410 may be energized and their field lines may be pulled upward along longitudinal axis 460. Then, because the field lines of magnetic fields 410 and 420 are in opposing directions, they may push against each other. As a result, the single magnetic null 430 may be forcedly separated to create two distinct magnetic nulls 440a, 440b or "X-points". The movement of the magnetic null 430 and the creation of the X-points 440a, 440b constitutes magnetic reconnection.

In an embodiment (not shown), a single magnetic null, or X-point, may be created. Specifically, as the magnetic reconnection coil 380 is rapidly energized (or pulsed), the power (voltage or current) supplied by the pulse of the magnetic reconnection coil 380 may rapidly change and reconfigure the magnetic fields 410, 420 during the risetime of the pulse. The field lines may be pulled upward along longitudinal axis 460 and the opposing field lines of magnetic fields 410 and 420 may push against each other to create a single X-point (rather than two X-points). It is to be understood that the present disclosure is not to be limited to the creation of any particular number of X-points. While the present disclosure describes the creation of single and/or dual X-points, it is to be understood that any number of X-points may be generated based on the principles of magnetic reconnection.

In an embodiment, the fusion reactor 300 may be filled with fusion gas at or before the risetime of the pulse of the magnetic reconnection coil 380. The rapid change in magnetic fields caused by the pulse during the risetime results in a high induced azimuthal electric field, forcing the fusion gas to break down into its constituent ions and free electrons, thereby effectively generating plasma. The resulting plasma may gather as two "plasma rings" at the magnetic nulls (X-points) 440a, 440b (or may gather as a single "plasma ring" at a single X-point, if only one X-point has been generated). The plasma is drawn to the one or more X-points because they comprise the regions of lowest magnetic pressure. In other words, as forces of the electric fields and other microturbulences act on the plasma, the plasma reorganizes and is naturally is pulled to the X-point(s).

In another embodiment, a pulse of the magnetic reconnection coil 380 may result in the formation of one or more magnetic nulls on one or more surfaces of the internal coils 340. In other words, when the fusion reactor 300 is filled with fusion gas, a pulse of the magnetic reconnection coil 380 may rapidly change the magnetic fields during the risetime and form nulls on the surfaces of the internal coils 340. The change in magnetic fields may induce a strong electric field, resulting in the formation of plasma on the surfaces of the internal coils 340, much like glazing on a donut.

It is to be understood that various aspects of the afore-described process of creating plasma via pulsation of the magnetic reconnection coil 380 may be adapted or modified without departing from the spirit or scope of the present disclosure. For example, although the present disclosure describes a magnetic reconnection coil 380 having two coils, any number of coils having any number of turns may be used. Likewise the magnetic reconnection coil 380 may be pulsed at any speed and/or frequency, and may have any corresponding risetime and/or fall time. Additionally, the plasma may be formed at one or both locations described in the disclosure (i.e., at one or more X-points and/or on one or more surfaces of the internal coils 340), as well as at other locations or surfaces within the enclosure 320.

Next, the magnetic reconnection coil 380 may also be used to derive fusion energy using the principles of magnetic reconnection. According to an embodiment, the process of deriving fusion energy may follow after the afore-described process of generating plasma (i.e., the plasma generated by pulsing the magnetic reconnection coil 380 may then be used to derive energy). In this case, the process would continue as shown and described in connection with Frame 3 below. Alternatively, plasma may be separately introduced into the fusion reactor 300 prior to pulsing the magnetic reconnection coil 380.

When plasma is separately to be introduced into the fusion reactor 300, the process beings by energizing the magnetic coils 330, 340, 350, 360 in the fusion reactor 300. Plasma is then introduced into the fusion reactor 300 and the charged particles of plasma may spiral around the field lines in the direction of the magnetic fields 410, 420, as shown in Frame 1 of FIG. 4. A single magnetic null 430 may be present between the magnetic fields 410, 420 of plasma. Then, as shown in Frame 2, the magnetic reconnection coil 380 may be rapidly energized (pulsed) at a speed of less than 1 ms. The pulsing of the magnetic reconnection coil 380 may rapidly rearrange or reconfigure the magnetic fields, generally at a timescale of 1 ms. Specifically, during the risetime of the pulse, the magnetic fields 410, 420 may become energized and the field lines may be pulled upward along a longitudinal axis 460. Because the field lines of magnetic fields 410 and 420 run in opposing directions, they may push against each other and converge. The convergence of the magnetic fields 410, 420 may cause the single magnetic null 430 to forcedly separate, thereby generating two magnetic nulls (or X-points) 440a, 440b. In another embodiment (not shown), a single X-point may be generated during the magnetic reconnection process. The generation of the one or more X-points begins to weaken the magnetic fields 410, 420, allowing the energized plasma spiraling around the field lines to be pulled up along the longitudinal axis 460 and gather as two rings of plasma at the two X-points 440a, 440b (or a single ring of plasma at the single X-point). The reconfiguration of the magnetic null 430 to create one or more X-points constitutes magnetic reconnection. This process of magnetic reconnection rapidly increases the overall plasma energy in the fusion reactor as the magnetic field energy decreases.

With reference now to Frame 3 of FIG. 4, immediately after the magnetic fields are rearranged and energized, with the plasma concentrated at the two X-points, the magnetic fields may be collapsed. Specifically, as the pulse current of the magnetic reconnection coil 380 falls (i.e., during the fall time of the pulse), the magnetic fields 410, 420 may be rapidly collapsed and may move to a lower energy state. The magnetic nulls 440a, 440b of Frame 2 carrying the rings of plasma may follow the downward movement of the magnetic fields 410, 420 and collide together to form a single magnetic null 450. The single magnetic null 450 may accelerate down to its baseline position at the center axis 310 of the fusion reactor 300. As the magnetic fields rapidly change, electric fields may be induced, generating large amounts of energy and heat in the plasma, potentially on the order of tens to hundreds of kilovolts (kV).

In the event the plasma is concentrated at a single X-point, or on the surface of one or more internal coils 340, collapsing the magnetic fields 410, 420 may yield a substantially similar result. Specifically, as the pulse current of the magnetic reconnection coil 380 falls (i.e., during the fall time of the pulse), the magnetic fields 410, 420 may be rapidly collapsed and may move to a lower energy state. If a ring of plasma is gathered at a single X-point, the ring of plasma may accelerate down to the baseline position at the center axis 310 of the fusion reactor 300. Likewise, if plasma is gathered on the surface of one or more internal coils 340, the plasma may accelerate down to the baseline position at the center axis 310. As the magnetic fields rapidly change, electric fields may be induced, generating large amounts of energy and heat in the plasma.

With reference now to Frame 4 of FIG. 4, as the field lines return to their baseline position, the total energy in the magnetic fields decreases (or is released), resulting in free energy in the system. The plasma within the single magnetic null 430 may also return to the center axis 310 and the energy released by the magnetic fields (from Frame 2) is transferred to the plasma. The resulting plasma may be energized and heated to such an extent that neutral beams and/or external heating injection mechanisms will not be required to heat the plasma to fusion conditions. This fusion energy in the plasma may then be extracted using means known in the art.

Figure 5:
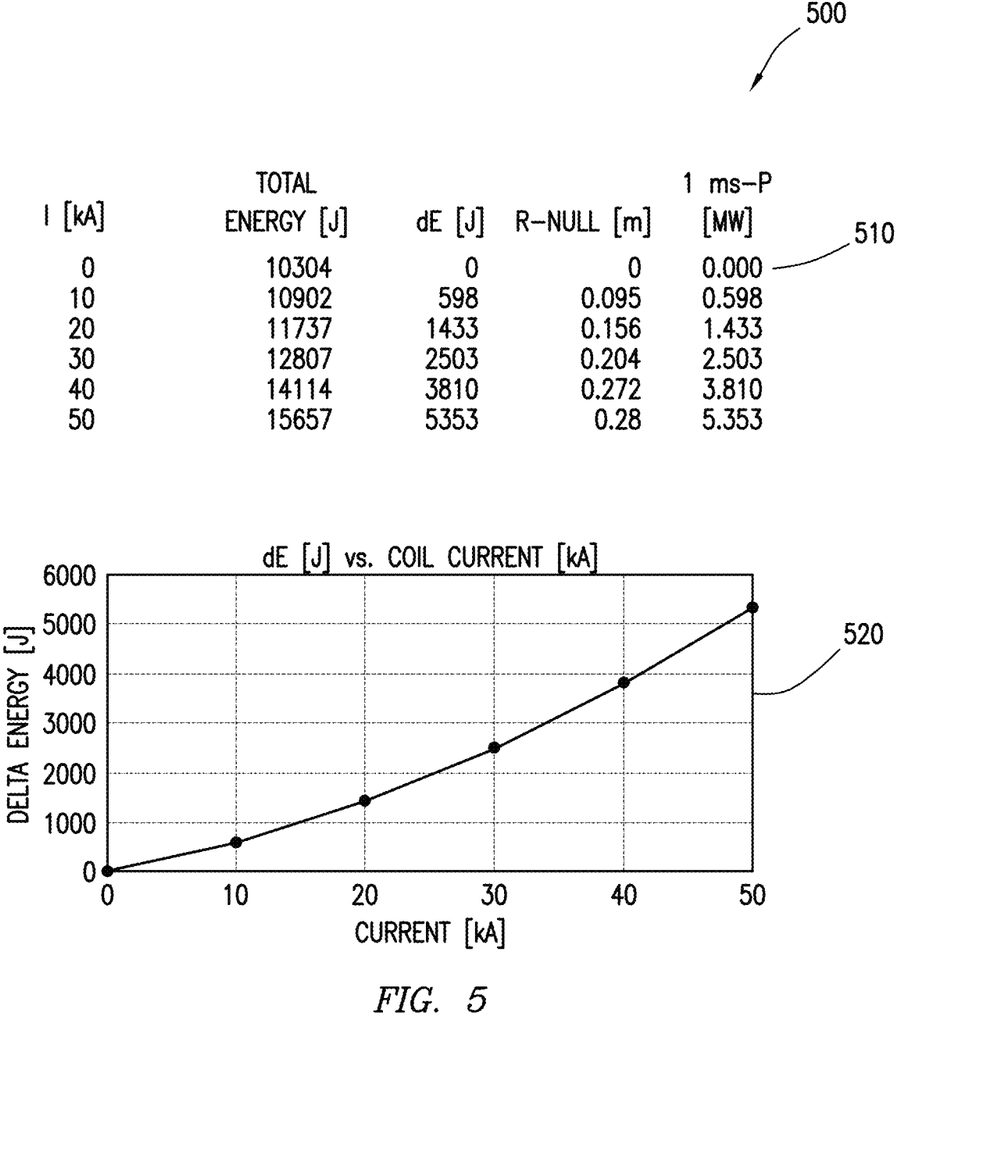
FIG. 5 illustrates example calculations of energy generated in a fusion reactor using the magnetic reconnection coil, in accordance with certain embodiments.

Reference is now made to FIG. 5, wherein is shown example calculations 500 of energy released based on testing the magnetic reconnection produced by the magnetic reconnection coil 380 of the present disclosure. As shown numerically in chart 510 and graphically in graph 520, as the current (in kiloamps, kA) is increased in the magnetic reconnection coil 380, the total derived energy (in Joules, J) may also increase. Thus, when the current in the magnetic reconnection coil 380 was pulsed at 50 kA, approximately 5 kJ of energy was liberated, corresponding to approximately 5 MW of heating. It is to be understood that the foregoing values were obtained in testing conditions. It is anticipated that in a fusion reactor, the magnetic reconnection coil 380 may be pulsed at a higher order, yielding the transfer of megajoules of energy, corresponding to tens of hundreds or more megawatts of heating.

In sum, by rapidly reconfiguring magnetic fields of plasma by magnetic reconnection, and then allowing those fields to collapse, the magnetic reconnection coil 380 of the present disclosure provides an efficient means to generate energy. More specifically, as the pulse of the magnetic reconnection coil 380 reconfigures the magnetic field in the fusion reactor 300 over a short time, magnetic fields are energized. As the magnetic fields are collapsed, the field energy decreases and the released energy from the magnetic fields may be transferred to the plasma.

There are various advantages in using the magnetic reconnection coil, as disclosed herein. First, the process employed with the magnetic reconnection coil is highly efficient; some experiments calculate a 90% efficiency rate with the respect to the energy derived. Moreover, the process allows plasma ions to get hotter than electrons, which is ideal for advanced fusion fuels as radiation losses scale with electron temperature, but fusion occurs with heated ions. Next, the process may drive a fusion reactor all the way to ignited fusion conditions, resulting in the generation of more energy than it consumes. The process also allows for flexibility, allowing for continuous operation with a first-generation deuterium-tritium fuel or pulsed operation with advanced fuels.

Additional advantages of magnetic reconnection coil include its ability to be detached after the plasma has been created; this many ensure lessened power losses from the plasma. The magnetic reconnection coil also offers the ability to create and heat plasma; many existing systems only allow for one of these functions. The techniques employed with the magnetic reconnection coil works over a wide range of gas densities since it does not rely on collisions between particles to exchange energy, thereby allowing for higher plasma temperatures to be achieved in low density plasmas than would be possible in neutral beam heated plasmas which rely on collisions to transfer energy between the plasma constituents.

It is to be understood that various aspects of the aforedescribed process of deriving energy via pulsation of the magnetic reconnection coil 380 may be adapted or modified without departing from the spirit or scope of the present disclosure. For example, although the present disclosure describes a single pulse, it is to be understood that the magnetic reconnection coil may be pulsed any number of times and/or the process repeated any number of times to add heat and/or avoid cooling of the plasma. Moreover, the repetition of the process may be compatible with the pulse time of the magnetic reconnection coil 380 (i.e., for a pulse time of 1 ms, the process may be repeated at a frequency of 1 kHz).

Figure 6:
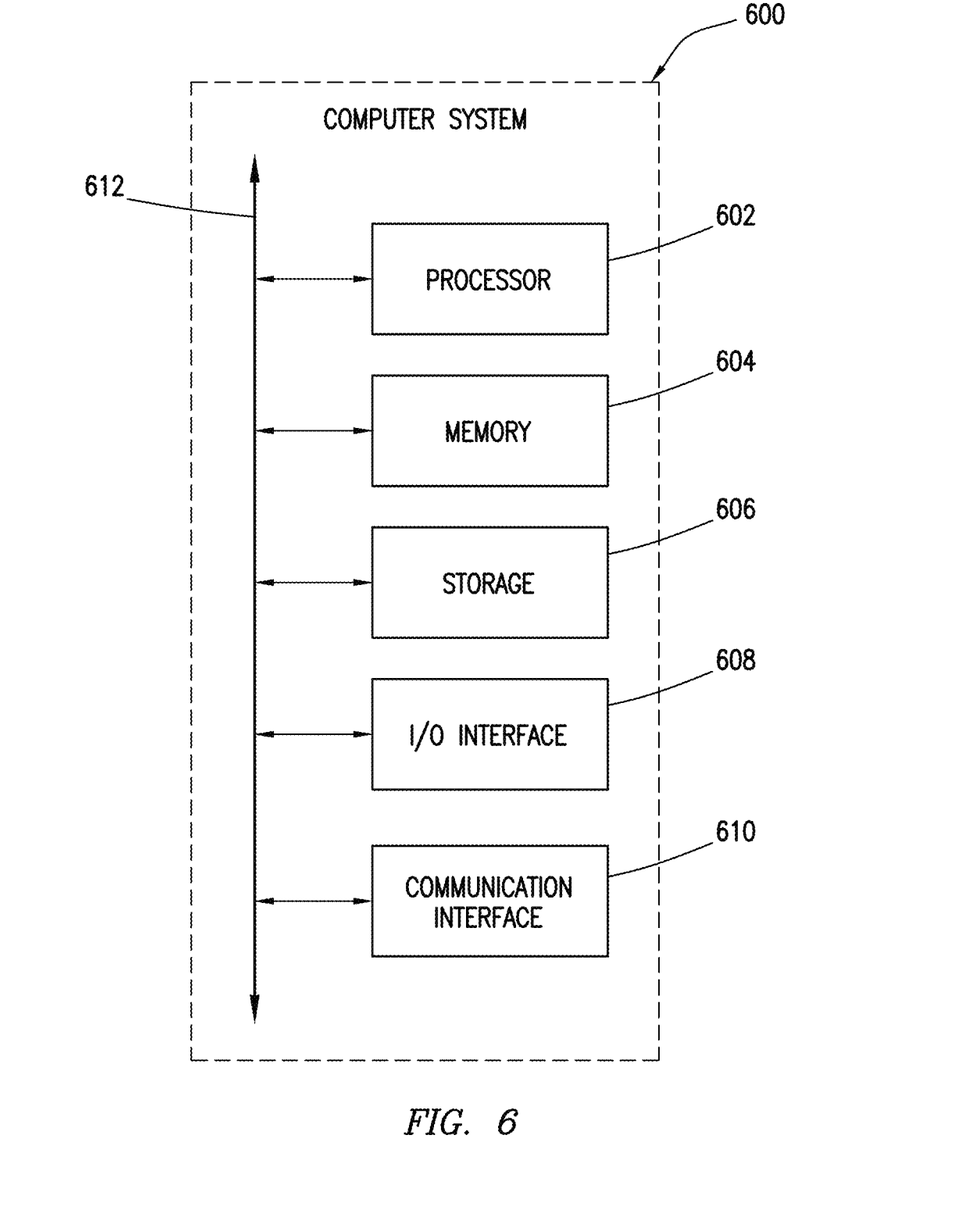
FIG. 6 illustrates a computer system, in accordance with certain embodiments.

Reference is now made to FIG. 6, wherein is shown an example computer system 500. In particular embodiments, one or more computer systems 600 are utilized by fusion reactor 300 for any aspects requiring computerized control.

Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system comprising:
    an enclosure;
    one or more internal magnetic coils suspended within an interior of the enclosure and co-axial with a center axis of the enclosure;
    one or more encapsulating magnetic coils co-axial with the center axis of the enclosure, the encapsulating magnetic coils having a larger diameter than the internal magnetic coils;
    one or more mirror magnetic coils co-axial with the center axis of the enclosure; and
    one or more magnetic reconnection coils co-axial with the center axis of the enclosure, wherein the one or more magnetic reconnection coils, when pulsed by a power source, are disposed to reconfigure one or more magnetic fields within the enclosure;
    wherein:
        the one or more magnetic fields are reconfigured from a baseline position during a risetime of a pulse of the one or more magnetic reconnection coils;
        the reconfiguration of the one or more magnetic fields is disposed to increase energy in the one or more magnetic fields and induce an electric field; and
        the reconfiguration of the one or more magnetic fields generates at least one magnetic null in the one or more magnetic fields.

2. The system of claim 1, wherein, if fusion gas is introduced inside the enclosure, the electric field breaks down the fusion gas and causes the generation of plasma, the plasma disposed to gather at the at least one magnetic null.

3. The system of claim 1, wherein plasma, if introduced inside the enclosure, is disposed to gather at the at least one magnetic null.

4. The system of claim 3, wherein during a fall time of the pulse of the one or more magnetic reconnection coils, the energy in the one or more magnetic fields decreases.

5. The system of claim 4, wherein the decrease in the energy in the one or more magnetic fields causes the at least one magnetic null to accelerate down to the baseline position.

6. The system of claim 5, wherein the energy in the one or more magnetic fields is released into the plasma.

7. The system of claim 6, wherein the plasma releases heat.

8. A method comprising:
    energizing one or more internal magnetic coils suspended within an interior of an enclosure and co-axial with a center axis of the enclosure;
    energizing one or more encapsulating magnetic coils co-axial with the center axis of the enclosure, the encapsulating magnetic coils having a larger diameter than the internal magnetic coils;
    energizing one or more mirror magnetic coils co-axial with the center axis of the enclosure;
    pulsing one or more magnetic reconnection coils co-axial with the center axis of the enclosure, wherein a pulse of the one or more magnetic reconnection coils is operable to reconfigure one or more magnetic fields from a baseline position within the enclosure, thereby increasing energy in the one or more magnetic fields and generating at least one magnetic null in the one or more magnetic fields;
    introducing fusion gas into the enclosure; and
    generating plasma at the at least one magnetic null.

9. The method of claim 8, wherein the reconfiguration of the one or more magnetic fields comprises magnetically reconnecting the one or more magnetic fields.

10. The method of claim 8, wherein the reconfiguration of the one or more magnetic fields occurs at a rise time of the pulse of the one or more magnetic reconnection coils.

11. The method of claim 8, wherein the reconfiguration of the one or more magnetic fields induces an electric field.

12. The method of claim 11, wherein the electric field breaks down the fusion gas and causes the generation of the plasma, the plasma disposed to gather at the at least one magnetic null.

13. A method comprising:
    energizing internal magnetic coils suspended within an interior of the enclosure and co-axial with a center axis of the enclosure, the two internal magnetic coils each having a toroidal shape;
    energizing a plurality of encapsulating magnetic coils co-axial with the center axis of the enclosure, the encapsulating magnetic coils having a larger diameter than the internal magnetic coils;
    energizing two mirror magnetic coils co-axial with the center axis of the enclosure; and
    pulsing one or more magnetic reconnection coils co-axial with the center axis of the enclosure, wherein a pulse of the one or more magnetic reconnection coils is operable to reconfigure the one or more magnetic fields from a baseline position in the enclosure, thereby increasing energy in the one or more magnetic fields and generating at least one magnetic null in the one or more magnetic fields;
    introducing plasma into the enclosure, the plasma disposed to gather at the at least one magnetic null; and
    collapsing the one or more magnetic fields to decrease the energy in the one or more magnetic fields and release the energy into the plasma.

14. The method of claim 13, the reconfiguration of the one or more magnetic fields comprises magnetically reconnecting the one or more magnetic fields.

15. The method of claim 13, wherein the reconfiguration of the one or more magnetic fields occurs at a rise time of the pulse of the one or more magnetic reconnection coils.

16. The method of claim 13, wherein the step of collapsing occurs at a fall time of the pulse of the one or more magnetic reconnection coils.

17. The method of claim 13, wherein the step of collapsing further comprises:
 accelerating the at least one magnetic null to the baseline position.

18. The method of claim 13, wherein the step of collapsing heats the plasma.

\* \* \* \* \*